(12) United States Patent
Ide et al.

(10) Patent No.: US 9,761,873 B2
(45) Date of Patent: Sep. 12, 2017

(54) NEGATIVE ELECTRODE ACTIVE MATERIAL FOR NONAQUEOUS ELECTROLYTE SECONDARY BATTERIES

(75) Inventors: Hitohiko Ide, Saitama (JP); Daisuke Inoue, Saitama (JP); Shinya Kagei, Saitama (JP); Natsumi Shibamura, Saitama (JP); Yasunori Tabira, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 70 days.

(21) Appl. No.: 14/118,372

(22) PCT Filed: Jun. 25, 2012

(86) PCT No.: PCT/JP2012/066114
§ 371 (c)(1),
(2), (4) Date: Nov. 18, 2013

(87) PCT Pub. No.: WO2013/002163
PCT Pub. Date: Jan. 3, 2013

(65) Prior Publication Data
US 2014/0183406 A1  Jul. 3, 2014

(30) Foreign Application Priority Data
Jun. 27, 2011 (JP) .................... 2011-142122

(51) Int. Cl.
*H01M 4/38* (2006.01)
*C01B 33/02* (2006.01)
*H01M 4/134* (2010.01)
*H01M 10/0525* (2010.01)

(52) U.S. Cl.
CPC ............. *H01M 4/386* (2013.01); *C01B 33/02* (2013.01); *H01M 4/134* (2013.01); *H01M 4/38* (2013.01); *H01M 10/0525* (2013.01)

(58) Field of Classification Search
None
See application file for complete search history.

(56) References Cited

U.S. PATENT DOCUMENTS 6,835,485 B2   12/2004   Ukai et al.
7,160,646 B2   1/2007   Ohshita et al.
(Continued)

FOREIGN PATENT DOCUMENTS

| CN | 1394363 A | 1/2003 |
|---|---|---|
| CN | 1476645 | 2/2004 |

(Continued)

OTHER PUBLICATIONS

English text machine translation of Tako et al. (JP 2009-032644 A), PDF pp. 1-15 attached to the case file.*
(Continued)

*Primary Examiner* — Katie L Hammer
(74) *Attorney, Agent, or Firm* — Young & Thompson (57) ABSTRACT

A negative electrode active material for nonaqueous secondary batteries is disclosed. The active material contains a silicon solid solution having one or more than one of a group 3 semimetal or metal element, a group 4 semimetal or metal element except silicon, and a group 5 nonmetal or semimetal element incorporated in silicon as a solute element. The solute element is present more on the crystal grain boundaries of the silicon solid solution than inside the grains.

5 Claims, 4 Drawing Sheets

(56) References Cited

U.S. PATENT DOCUMENTS

| | | | |
|---|---|---|---|
| 8,574,764 | B2 | 11/2013 | Sung et al. |
| 8,632,695 | B2 | 1/2014 | Ide et al. |
| 2002/0146623 | A1 | 10/2002 | Suzuki et al. |
| 2003/0039891 | A1 | 2/2003 | Nitta |
| 2003/0175589 | A1 | 9/2003 | Kaminaka et al. |
| 2004/0224040 | A1 | 11/2004 | Furuya |
| 2006/0008706 | A1* | 1/2006 | Yamaguchi et al. .......... 429/313 |
| 2006/0040182 | A1* | 2/2006 | Kawakami .......... H01M 10/052 429/218.1 |
| 2008/0145759 | A1 | 6/2008 | Sung et al. |
| 2009/0061322 | A1 | 3/2009 | Kawakami et al. |
| 2009/0305129 | A1* | 12/2009 | Fukui ................... H01M 4/134 429/200 |

FOREIGN PATENT DOCUMENTS

| | | |
|---|---|---|
| EP | 2557618 | 2/2013 |
| JP | 2000-149937 | 5/2000 |
| JP | 2001-307723 | 11/2001 |
| JP | 2002-042788 | 2/2002 |
| JP | 2002-75351 | 3/2002 |
| JP | 2003-197188 | 7/2003 |
| JP | 2004-047182 | 2/2004 |
| JP | 2005-071771 | 3/2005 |
| JP | 2006-100244 | 4/2006 |
| JP | 2008-135364 | 6/2008 |
| JP | 2009-032644 | 2/2009 |
| JP | 2009-170265 | 7/2009 |
| JP | 2010-135336 | 6/2010 |
| JP | 2011-40310 | 2/2011 |
| WO | WO 01/81033 | 11/2001 |
| WO | WO 2011/111709 | 9/2011 |

OTHER PUBLICATIONS

International Search Report, PCT/JP2012/066114, Sep. 25, 2012.
Anonymous, "Group (periodic table)—Wikipedia, the free encyclopedia," Jan. 5, 2015.

* cited by examiner

Fig. 1

Fig. 2(a) Before heat treatment

Fig. 2(b) Site of *1

Fig. 2(c) Site of *2

Fig. 2(d) Site of *3

Fig. 3(a) After heat treatment

Fig. 3(b) Site of *1

Fig. 3(c) Site of *2

Fig. 3(d) Site of *3

NEGATIVE ELECTRODE ACTIVE MATERIAL FOR NONAQUEOUS ELECTROLYTE SECONDARY BATTERIES

TECHNICAL FIELD

This invention relates to a negative electrode active material for use in nonaqueous secondary batteries, such as lithium secondary batteries. It also relates to a negative electrode having the active material for nonaqueous secondary batteries and a nonaqueous secondary battery having the negative electrode.

BACKGROUND ART

A carbonaceous material has been normally used as a negative electrode active material of nonaqueous secondary batteries. However, a carbonaceous material has difficulty on account of its low theoretical discharge capacity in dealing with the increase of power consumption of small-sized electric/electronic equipment due to their multifunctionality and the use in an on-board battery.

Silicon-containing materials having a higher capacity than carbonaceous materials have been studied as a negative electrode active material taking the place of the carbonaceous materials. For example, patent literature 1 below proposes using a boron-containing silicon material as a negative electrode active material. According to the disclosure, mixing a silicon material powder having a suitable particle size with a low concentration of boron and heating the mixture under a certain condition provide a boron-containing silicon material powder having a considerably smaller amount of silicon boride ($SiB_4$) than thermodynamically estimated from the boron content and assuming a substantially supercooled state. Using such a boron-containing silicon material powder is described as providing markedly reduced capacity loss and improved cycle characteristics while retaining the large discharge capacity inherently possessed by silicon.

Another negative electrode active material containing silicon and boron is known from patent literature 2 below. According to the disclosure, the intended active material is obtained by introducing a molten alloy containing silicon and boron into a swirling water flow either directly or after being atomized by gas into droplets thereby to rapidly cool the molten alloy.

CITATION LIST

Patent Literature

Patent Literature 1: US 2002/0146623A1
Patent Literature 2: JP 2004-47182A

SUMMARY OF INVENTION

Technical Problem

Use of the boron-containing silicon material powders described in Patent Literatures 1 and 2 are still insufficient to improve charge/discharge cycle characteristics and charge/discharge rate characteristics of batteries.

Accordingly, an object of the invention is to provide a negative electrode active material and a negative electrode for nonaqueous secondary batteries which eliminate various disadvantages of the aforementioned conventional techniques.

Solution to Problem

The invention provides a negative electrode active material for nonaqueous secondary batteries. The negative electrode active material contains a silicon solid solution. The silicon solid solution has one or more than one element selected from a group 3 semimetal or metal element, a group 4 semimetal or metal element except silicon, and a group 5 nonmetal or semimetal element incorporated in silicon. The one or more than one element is present more on the crystal grain boundaries of the silicon solid solution than inside the crystal grains.

The invention also provides a negative electrode for nonaqueous secondary batteries having the negative electrode active material and a nonaqueous secondary battery having the negative electrode.

The invention also provides a suitable process for producing the negative electrode active material. The process includes the steps of (1) preparing a mixed melt of silicon and a group 3 semimetal or metal element, a group 4 semimetal or metal element except silicon, or a group 5 nonmetal or semimetal element, (2) introducing the mixed melt into a liquid coolant to form a vapor film covering the mixed melt in the coolant, (3) rupturing the vapor film to bring the mixed melt and the coolant into direct contact to cause boiling as a result of spontaneous nucleation, (4) rending and atomizing the mixed melt by making use of the pressure wave resulting from the boiling while cooling and solidifying the mixed melt to give a silicon solid solution, and (5) heating the silicon solid solution at 500° to 1200° C. for 0.3 to 20 hours.

Advantageous Effects of Invention

Use of the negative electrode active material of the invention brings about improvement on charge/discharge cycle characteristics of a nonaqueous secondary battery, increase in reversibility in the initial charge/discharge cycle of a nonaqueous secondary battery, and suppression of expansion of a negative electrode active material layer. The negative electrode active material of the invention exhibits improved oxidation resistance.

DESCRIPTION OF EMBODIMENTS

The present invention will be described with reference to its preferred embodiments. The negative electrode active material according to the invention is for use in nonaqueous secondary batteries, including lithium secondary batteries. The negative electrode active material is characterized by having a silicon solid solution as a matrix. The silicon solid solution has a group 3 semimetal or metal element, a group 4 semimetal or metal element except silicon, or a group 5 nonmetal or semimetal element incorporated as a solute. The elements mentioned will be referred to as a solute element. Examples of the solute element include boron as a group 3 semimetal element, germanium as a group 4 semimetal element, tin as a group 4 metal element, nitrogen and phosphorus as a group 5 nonmetal element, and arsenic, antimony, and bismuth as a group 5 semimetal element. Preferred of them are boron (group 3 semimetal element), germanium (group 4 semimetal element), and phosphorus (group 5 nonmetal element). These solute elements may be used either individually or in combination of one or more thereof. When two or more solute elements are used in combination, they are desirably of the same group.

While forming a solid solution with silicon, the solute element is present more on the crystal grain boundaries of the silicon solid solution than inside the crystal grains. In other words, the solute element is not uniformly distributed in a single crystal grain but is present more on the grain boundary than inside the crystal grain (see FIGS. 2 and 3 that will be explained later). This does not mean that the solute element is absent in the central portion of the crystal grain. While the solute element exists throughout the crystal grain, its distribution is not uniform in the grain, i.e., it exists relatively more on the grain boundary than inside. In the following description, this state of existence will be phrased "localization on the grain boundary or boundaries" for the sake of convenience. The inventors consider that, because of the localization of the solute element on the grain boundaries, electron conduction paths form on the boundaries to enhance the electron conductivity of the silicon solid solution. A nonaqueous secondary battery of which the negative electrode contains the so-characterized negative electrode active material achieves improved charge/discharge cycle characteristics and increased reversibility in the initial charge/discharge cycle. In addition to this, the negative electrode active material of the invention exhibits increased oxidation resistance, which is advantageous in effectively preventing deterioration of a battery stored in a high temperature environment and preventing reduction of discharge capacity of a battery being repeatedly charged and discharged in a high temperature environment. As used herein, the term "high temperature" is intended to indicate a temperature in the range of from 45° to 80° C. as is generally recognized in the art. Furthermore, using the negative electrode active material of the invention is effective in reducing expansion of a negative electrode active material layer and also in increasing the load on the negative electrode active material when a nonaqueous secondary battery having the negative electrode active material is in use.

Whether a solute element is present more on the crystal grain boundaries than inside the crystal grains may be judged by transmission electron microscopic (TEM) observation and electron energy loss spectroscopy (EELS) as will be described with reference to FIGS. 2 and 3.

In particular, the negative electrode active material of the invention which has boron as a solute element is advantageous in that the side reaction involved in a negative electrode during charge and discharge, such as electrolyte decomposition, is suppressed compared with pure silicon or other silicon alloys used as a negative electrode active material, in addition to the above described effects on charge/discharge cycle characteristics. Occurrence of a by-product causes not only expansion of the electrode but also other inconveniences, such as consumption of lithium active in the electrode reaction. While the mechanism about reduction of a by-product in the active material having boron as a solute and silicon as a solvent has not yet been made clear, the inventor makes the following assumption: introduction of boron in silicon is considered to cause introduction of many positive holes in the solid solution. Because the main side reaction of the electrolyte on a negative electrode is an electrophilic reaction, it is believed that the existence of many positive holes in the negative electrode active material reduces the side reaction.

It should be noted that the above discussed silicon solid solution is clearly distinguished from a silicon alloy. The silicon solid solution shows diffraction peaks corresponding to those of silicon in XRD. In contrast, a silicon alloy shows diffraction peaks specific to the silicon alloy with no peaks assigned to silicon. Although the silicon solid solution preferably consists of itself, it is allowed to contain an alloy or intermetallic compound between silicon and the solute element in a small proportion that does not impair the effects of the invention.

While, as noted above, the silicon solid solution shows a diffraction peak corresponding to a peak of silicon as a matrix element in XRD, it has been proved preferred that the position of the former peak be shifted from the position of the latter peak (the peak of silicon) to the smaller or greater angle side. More specifically, it is preferred that the solid solution show an XRD pattern in which the position of the peak corresponding to the peak assigned to the (422) plane of diamond-structured silicon shifts to the smaller or greater angle side relative to the position of the latter peak. As a result of further study, the inventors have proved it advantageous to represent the amount of the above-identified shift based on a difference between the amount of shift S1 of a silicon solid solution as obtained by various rapid cooling methods (e.g., roll-cooling, atomization, and steam explosion atomization) in the hereinafter described process for producing the silicon solid solution and the amount of shift S2 of a silicon solid solution obtained by subjecting the silicon solid solution as obtained by the rapid cooling to a heat treatment, i.e., $\Delta S$ (=S1–S2). Specifically, it is preferred that $\Delta S$ be in the range of from –0.45 to 0.5, more preferably from –0.1 to 0.45. When the shift is to the larger angle side, the S1 and S2 values are to be represented by a positive number. When the shift is to the smaller angle side, the values are to be represented by a negative number. Accordingly, a positive $\Delta S$ value means a shift to a larger angle position, and a negative $\Delta S$ value means a shift to a smaller angle position. The $\Delta S$ value represents the degree of localization of a solute element on the crystal grain boundaries in the silicon solid solution. The larger the $\Delta S$ value, the larger the degree of localization of the solute element. When the $\Delta S$ is within the range recited above, the following effects are produced by a nonaqueous secondary battery having a negative electrode active material containing the silicon solid solution: further improved charge/discharge cycle characteristics, further increased reversibility in the initial charge/discharge cycle, and further increased oxidation resistance. The S2, the amount of shift of a silicon solid solution as obtained by various rapid cooling techniques described supra followed by a heat treatment, is preferably 0.001 to 1.0, more preferably 0.001 to 0.8, even more preferably 0.005 to 0.4, in the case of a larger angle side shift; or –0.001 to –1.0, more preferably –0.001 to –0.8, even more preferably –0.001 to –0.4, in the case of a smaller angle side shift.

Whether the peak position shifts to the smaller angle side or the larger angle side depends on the lattice constant of the silicon solid solution. When the lattice constant of the silicon solid solution is larger than that of silicon, the position of a peak of the silicon solid solution shifts to the smaller angle side relative to the position of the corresponding peak of silicon. Conversely, when the lattice constant of the silicon solid solution is smaller than that of silicon, the peak position of the silicon solid solution shifts to the greater angle side relative to the corresponding peak position of silicon. The direction of the shift is not critical in the invention. The amount of the shift is influential on the effects of the invention.

The reason why the position of the diffraction peak assigned to the (422) plane of silicon is used as a benchmark for the amount of shift is based on a rule of thumb discovered by the present inventors to the effect that good reproducibility of the shift is obtained. Therefore, to use the diffraction peak assigned to the (422) plane of silicon as a benchmark for representing the amount of shift is not essential to the invention.

In determining the position of the diffraction peak assigned to the (422) plane of silicon and the amount of shift, CuKα radiation is used as an X ray source, and the diffraction peaks obtained are separated into those of CuKα$_1$ radiation and those of CuKα$_2$ radiation. The analysis is then made on the diffraction peaks by CuKα$_1$ radiation. The XRD is carried out using, for example, a Bruker D8 Advance diffractometer available from Bruker AXS. The measuring angle may be 2θ=15° to 120° at 1° 2θ per step.

While the negative electrode active material of the invention is characterized by the localization of the solute element on the grain boundaries, the inventors also revealed as a result of further study that it is preferred for the silicon solid solution discussed above to have a lattice strain. The lattice strain is caused by site-to-site variation of the lattice constant of crystallites constituting the silicon solid solution.

Whether a silicon solid solution has a lattice strain is qualitatively determined by the width of an XRD peak. If a diffraction peak of a silicon solid solution has approximately the same width as the corresponding peak of silicon, the silicon solid solution is deemed to have no lattice strain. If, on the other hand, a diffraction peak of a silicon solid solution has a broader width than the corresponding peak of silicon, the silicon solid solution is judged to have a lattice strain.

To quantitatively determine the lattice strain, the Hall method represented by Formula. (1) below, which is well known in the field of X-ray crystallography, is used advantageously (see Hall, W. H., J. Inst. Met., 75, 1127 (1950); idem, Proc. Phys. Soc., A62, 741 (1949)).

$$\beta \cos \theta / \lambda = 2\eta (\sin \theta / \lambda) + (1/\epsilon) \quad \text{Formula. (1)}$$

wherein η is a lattice strain (dimensionless number); β is diffraction-line broadening (in radians) due to crystallite sizes; λ, is the wavelength (Å) of measuring X-ray; θ is the Bragg angle (in radians) of a diffraction line; and ε is a constant.

As a result of further study, the inventors have found that the lattice strain is represented to advantage in terms of a difference between the lattice strain L1 of a silicon solid solution as obtained by various rapid cooling methods (e.g., roll-cooling, atomization, and steam explosion atomization) in the hereinafter described process for producing the silicon solid solution and the lattice stain L2 of a silicon solid solution obtained by subjecting the silicon solid solution as obtained by the rapid cooling to a heat treatment, i.e., ΔL (=L1−L2). Specifically, it is preferred that ΔL be in the range of from 0.001 to 1.0, more preferably 0.01 to 0.5, even more preferably 0.05 to 0.2. With the ΔL falling within the above range, the following effects are produced by a nonaqueous secondary battery having a negative electrode active material containing the silicon solid solution: further improved charge/discharge cycle characteristics and further increased reversibility in the initial charge/discharge cycle. The lattice strain value L2 of the silicon solid solution obtained by the rapid cooling followed by heating is preferably 0.01 to 1.0, more preferably 0.1 to 0.4.

In the invention, the lattice strain values L1 and L2 of a silicon solid solution are determined by the following method. Diffraction peaks of the silicon solid solution are determined by powder XRD using CuKα as an X-ray source. The integral breadth of all the diffraction peaks appearing at or below the diffraction angle (2θ) of 120° is measured. The above described Hall method is applied to the measured value to calculate the lattice strain. LaB$_6$, the standard reference material for X-ray diffractometry, is used to estimate an instrumental function in calculating the integral breadth. The diffraction peaks appearing at or below 120° (diffraction angle) typically include those assigned to the (111), (220), (311), (400), (331), (422), (333), (440), and (531) planes.

The amount of the solute element in the silicon solid solution is preferably 0.01 to 10 at %, more preferably 1 to 6 at %, even more preferably 1 to 3 at %, relative to silicon atom. With the solute element content falling in that range, the charge/discharge cycle characteristics, reversibility of the initial charge/discharge cycle, and the like improve further. The solute element content may be determined by, for example, inductively coupled plasma emission spectroscopy (ICP).

Figure 1:
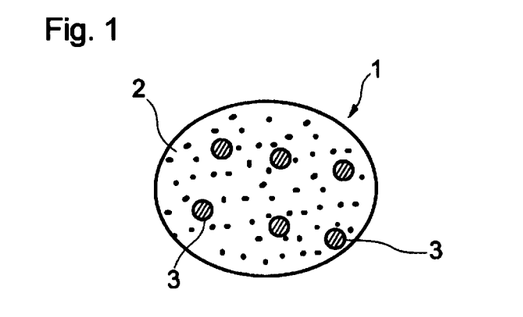
FIG. 1 is a schematic illustration of a composite of a silicon solid solution and a silicon alloy that can be used in the invention.
Figure 2A:
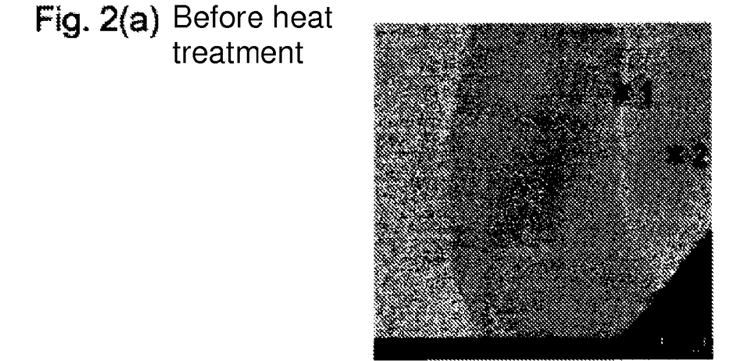
FIG. 2(a), FIG. 2(b), FIG. 2(c), and FIG. 2(d) each represent an element distribution in a silicon solid solution before a heat treatment.
Figure 2B:
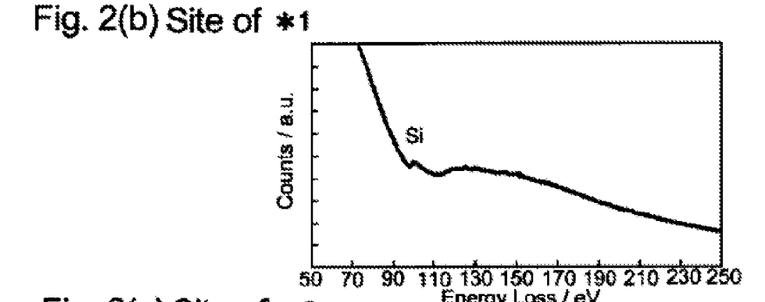
Figure 2C:
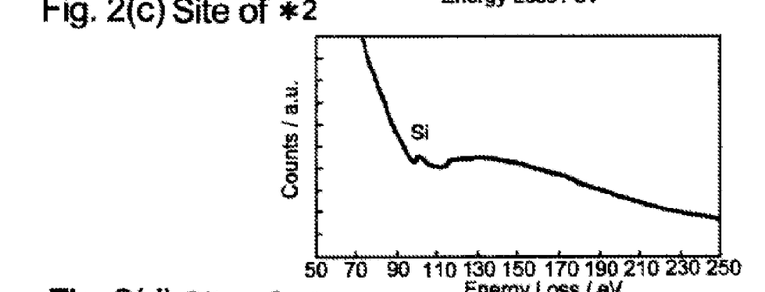
Figure 2D:
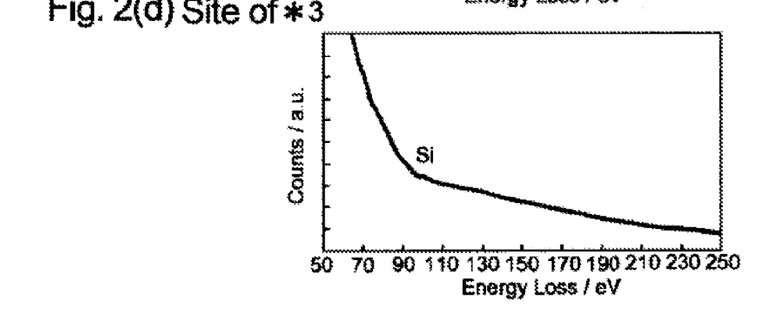
Figure 3A:
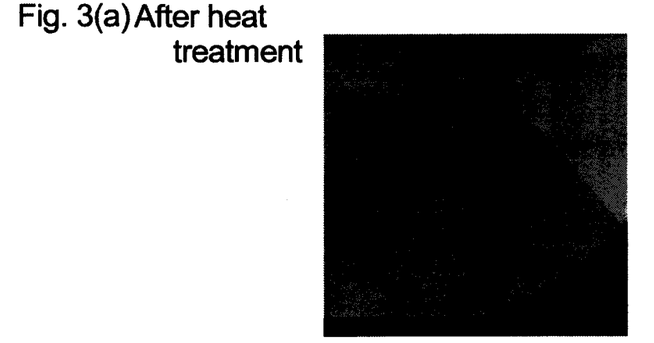
FIG. 3(a), FIG. 3(b), FIG. 3(c), and FIG. 3(d) each represent an element distribution in a silicon solid solution after a heat treatment.
Figure 3B:
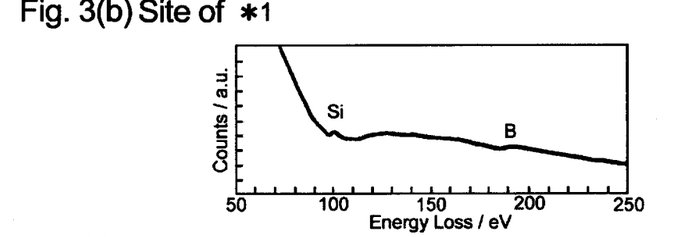
Figure 3C:
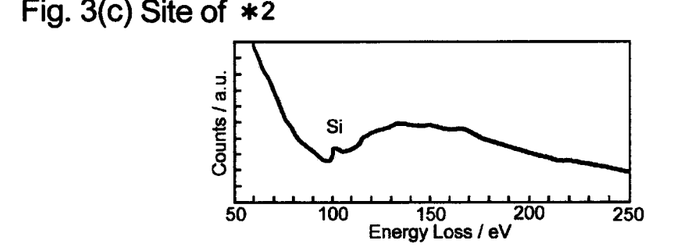
Figure 3D:
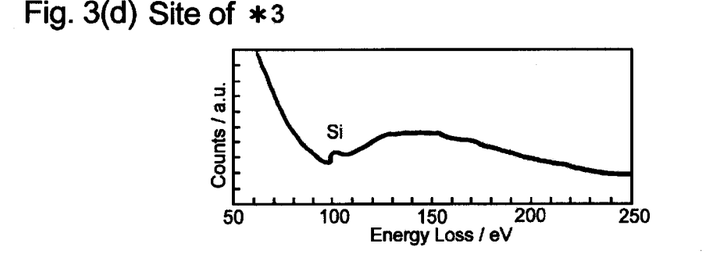

The negative electrode active material of the invention may consist solely of the above described silicon solid solution or may comprise a composite of the silicon solid solution and a silicon alloy. As schematically illustrated in FIG. 1, the composite 1 has a silicon solid solution as a matrix 2 and a silicon alloy phase 3 precipitated in the matrix 2. Accordingly, a mere mixture of a silicon solid solution and a silicon alloy is not included under the term "composite" as referred to herein. A negative electrode active material made of such a silicon solid solution/silicon alloy composite has an advantage of higher electroconductivity as compared with a negative electrode active material made solely of the silicon solid solution. When, in particular, the silicon alloy phase 3 is precipitated on the grain boundaries of the silicon solid solution, the above noted various advantageous effects will become more pronounced. Whether or not a silicon alloy phase is precipitated in the silicon solid solution matrix is decided through XRD of the composite or by analyzing the elemental distribution in a small area of a cut section of the negative electrode active material using an energy dispersive X-ray spectroscope (EDX). In the cases where a silicon alloy phase is precipitated, a diffraction peak of the silicon alloy phase will appear overlapping the diffraction peak of the silicon solid solution.

Examples of the silicon alloy include an alloy of silicon with a transition metal, such as iron, nickel, titanium, cobalt, or copper. An alloy of silicon and niobium is also useful. It is particularly preferred to use, as an alloying metal forming the silicon alloy, such a metal (called a metal M) that the ratio of the metal M in the composition of the silicon alloy (i.e., the number of metal M atoms/(the number of Si atoms+the number of metal M atoms)×100) at the eutectic point of the silicon alloy ranges from 1 to 50 at %. Examples of such a metal M include iron (ratio of iron at the eutectic point: 26.5 at %), nickel (ratio of nickel at the eutectic point: 42 at %), titanium (ratio of titanium at the eutectic point: 16 at %), niobium (ratio of niobium at the eutectic point: 2 at %); and cobalt (ratio of cobalt at the eutectic point: 22.5 at %). The proportion of the transition metal in the composite is preferably 0.001 to 10 at %, more preferably 0.001 to 5 at %, even more preferably 0.01 to 3 at %, based on the number of Si atoms in the composite.

The silicon solid solution that can be used as a negative electrode active material of the invention is preferably produced through a process including the step (i) of preparing a silicon solid solution in which a solute element is not localized and the step (ii) of heat treating the silicon solid solution obtained in the step (i) to cause the solute element to be localized on the grain boundaries. The steps (i) and (ii) will hereinafter be described.

In the step (i), the silicon solid solution may be prepared by various methods, including methods capable of rapidly cooling a melt in the preparation of the silicon solid solution, such as a roll-cooling or atomization method capable of achieving a rate of melt cooling of $10^6$ K/s or higher. The cooling rate may be measured in accordance with the method taught in WO 2011/111709, para. [0042]. In particular, a silicon solid solution which is particulate is conveniently prepared by, for example, what we call a "steam explosion atomization method", also called CANOPUS method. The steam explosion atomization method is described in detail, e.g., in WO 01/081032, WO 01/081033, and Central Research Institute of Electric Power Industry, Report No. T01024 (April, 2012). According to this method, a mixed melt of silicon and a solute element is prepared, and the mixed melt is introduced into a liquid coolant, whereupon a vapor film covering the mixed melt is formed in the coolant. The vapor film is collapsed or ruptured to bring the mixed melt and the coolant into direct contact to cause boiling as a result of spontaneous nucleation. The pressure wave resulting from the boiling is made use of in rending and atomizing the mixed melt while cooling and solidifying the mixed melt.

Figure 4:
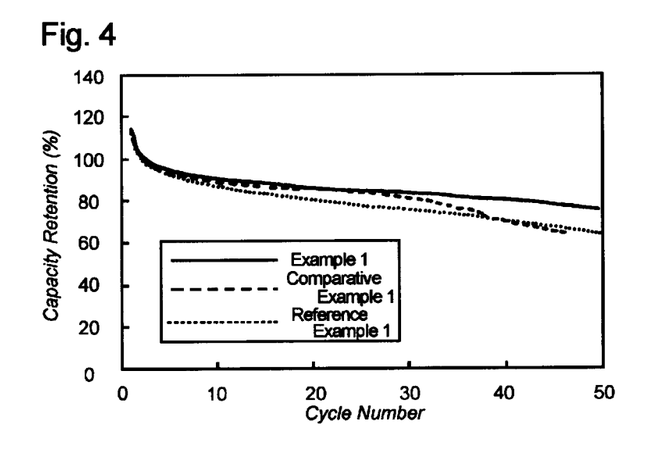
FIG. 4 is a graph showing the charge/discharge cycle characteristics of coin cells made by using the negative electrodes obtained in Example 1, Comparative Example 1, and Reference Example 1.

Apparatus that can be used to carry out the steam explosion atomization method include the one illustrated in FIGS. 3 and 4 of WO 01/081032 and FIGS. 3 and 4 of WO 01/081033. This apparatus includes a crucible in which the mixed melt is to be reserved. The crucible has at its bottom an openable and closable outlet through which the mixed melt is allowed to fall in drops. Below the outlet is provided a mixing nozzle for mixing the drops of the mixed melt and a coolant. The mixing nozzle may be a cylinder so that the drops of the mixed melt may fall in the cylinder. The cylinder is provided on its inner wall guide wire in a helical form so that the coolant may swirl downward along the guide wire. The purpose of swirling the coolant downward is to minimize the difference in falling speed between the mixed melt drops and the coolant and to lengthen the retention time in the cylinder. By this manipulation, the contact time between the mixed melt and the coolant is lengthened to secure the time required for cooling the mixed melt to induce the vapor film collapse and the subsequent boiling due to spontaneous nucleation. The inner diameter of the cylindrical mixing nozzle is sufficiently larger than the diameter of the mixed melt drops and yet sufficiently small for forming a gentle swirling flow. For example, the inner diameter is at least about 2 to 8 mm and not more than about 25 mm.

The mixed melt in the crucible is kept heated at temperatures such that, when it comes into direct contact with the coolant, the temperature of the interface between the mixed melt and the coolant is the spontaneous nucleation temperature or higher, preferably sufficiently higher than the spontaneous nucleation temperature. The temperature of the mixed melt is not higher than the temperature at which the vapor film collapses, for example, on contact with the coolant, namely not higher than the minimum film boiling temperature. The minimum film boiling temperature is decided by the temperatures of the mixed melt and the coolant with no external force applied thereto.

The coolant may be any liquid that is able to boil through spontaneous nucleation on contact with the mixed melt. Preferred examples of such a coolant include water, liquid nitrogen, an organic solvent, such as methanol or ethanol, and other liquids. Water that is superior in economy and safety is generally used.

The drops of the mixed melt from the crucible collide with the coolant in the mixing nozzle and disperse in the coolant on collision impact. Because of the high temperature of the mixed melt, the coolant around the individual drops boils to form a vapor film, and the system assumes a premixed state in which the individual drops are covered with the vapor film.

Upon local collapse or rupture of the vapor film of any dispersed drop (particle), a pressure wave is generated there and propagates to other particles to cause boiling following spontaneous nucleation. Since fragmentation of the mixed melt into fine particles results in increase of the specific surface area thereby to accelerate the cooling, there will exist a positive feedback such that vaporization of the coolant increases to produce more pressure waves. As a result, the fragmentation is promoted and, at the same time, cooling is effected rapidly. The mixed melt is thus fragmented efficiently without leaving coarse lumps.

A vapor film forms around the mixed melt drops as a result of vaporization of the coolant on receipt of the heat transferred from the mixed melt. The vapor film stabilizes when the heat budget between vaporization which progresses with the heat from the mixed melt and cooling by the coolant is balanced. Meanwhile, as the temperature of the mixed melt decreases, the heat budget is disrupted to cause condensation, that is, vapor film collapse occurs. The condensation takes place on the entire surface of the particle almost at one time. Therefore, the mixed melt comes into contact with the coolant on its entire surface at one time, and the interfacial temperature between the mixed melt and the coolant rises to or above the spontaneous nucleation temperature. As a result, boiling due to spontaneous nucleation occurs in the coolant around the mixed melt particle, i.e., the liquid on the lower temperature side. Boiling due to spontaneous nucleation results in rapid evaporation, and vapor bubbles expand rapidly to generate a high-pressure wave. The pressure wave propagates at an extremely high velocity and acts on the whole of individual mixed melt particles uniformly. Thus, the mixed melt particles are finely fragmented as if they are torn apart by the pressure wave. At the same time, since the mixed melt increases in specific surface area as a result of fragmentation, the cooling rate further increases. This increases evaporation of the coolant, which is followed by vapor film formation, vapor film collapse, and boiling due to spontaneous nucleation, thereby generating more pressure waves.

Since the mixed melt is fragmented into fine particles by utilizing the pressure waves generated by bubbles of several nanometers in size resulting from spontaneous nucleation, it is easy to obtain fine particles ranging in size from submicrometer order to 100 micrometer order. It is possible to produce microfine particles of several micrometers that have been difficult to obtain by conventional methods and apparatus for producing fine particles, especially particles of about 3 μm that have not been obtained by any conventional method. The yield is high because the whole drop of the mixed melt undergoes fragmentation all at once, leaving no large lumps. In addition, the particle size distribution is narrow, so that fine particles of desirable sizes can be obtained in a large proportion. In that case, an improved fragmentation efficiency (fragmentation ratio) per unit mass will be achieved. Furthermore, the specific surface area increases with the progress of fragmentation, thereby increasing the cooling rate.

The above discussed steam explosion atomization method is carried out, for example, under the following condition. A mixed melt is dropped in several gram portions, and the coolant is fed at such a rate that the amount thereof swirling in the mixing nozzle is approximately 100 ml.

A silicon solid solution is thus obtained through the above described operation. When the mixed melt is composed solely of silicon and a solute element, a silicon solid solution having the solute element in a silicon solvent is obtained. When using a mixed melt composed of silicon, a solute element, and an element alloying with silicon, there is obtained a composite having a silicon alloy phase precipitated in a silicon solid solution having the solute element in a silicon solvent. The mixed melt to be used is designed to have the same composition as a desired silicon solid solution or composite thereof.

The silicon solid solution as obtained by the steam explosion atomization method has a particulate form. The particle size is preferably 2 to 10 μm, more preferably 2 to 9 μm, in terms of $D_{50}$ measured by a laser diffraction scattering method. The particles as obtained by steam explosion atomization method may be pulverized by a dry and/or wet method to a particle size suitable for use as a negative electrode active material or may be classified to have a controlled size distribution. The silicon solid solution in this stage shows the above described diffraction peak shift in its XRD pattern from the position of the corresponding peak assigned to the (422) plane of silicon. The silicon solid solution in this stage has the above described lattice strain. However, the solute element is not localized on the grain boundaries in this stage. In order to localize the solute element on the grain boundaries, the silicon solid solution is subjected to a heat treatment in the step (ii).

In the step (ii) of heat treating, the silicon solid solution obtained in the step (i) is heated in vacuo. The heat treatment is carried out using, for example, a vacuum heating furnace, which is first purged with an inert gas, e.g., argon, and then evacuated to a predetermined degree of vacuum. Subsequently, the furnace is purged again with an inert gas, e.g., argon, and the inner pressure is set preferably at 0.1 MPa to $10^{-4}$ MPa. The heating is conducted in an inert gas (e.g., argon) atmosphere so as to prevent oxidation of the silicon solid solution. Heating in an inert gas atmosphere may be replaced with heating under vacuum. Whichever atmosphere is used, the heating temperature is preferably 500° to 1200° C., more preferably 700° to 1150° C., even more preferably 700° to 1100° C. The heating time is preferably 0.3 to 20 hours, more preferably 0.5 to 20 hours, even more preferably 0.5 to 10 hours, still more preferably 1 to 3.5 hours, provided that the heating temperature is in the range recited above. As the silicon solid solution is heated under these conditions, the solute element in the individual crystal grains of the silicon solid solution moves toward the grain boundaries, resulting in localization of the solute element on the crystal grain boundaries as compared with the inside of the crystal grains. The degree of localization is adjustable by the heating temperature or time. The heating under the conditions described above also results in changes of the shift in XRD and lattice strain of the silicon solid solution.

As is apparent from the foregoing description, the heat treatment performed in the step (ii) is different from "annealing" practiced in the technical field of alloys. While annealing is an operation of stabilizing a labile structure present in an alloy by heat application, the heat treatment of the step (ii) is an operation for moving the element that is structurally stable as a solute in silicon to the crystal grain boundaries by heat application. The heat treatment of the step (ii) and an annealing operation are alike in involving heat application but different in terms of the phenomenon occurring upon heat application and the resultant crystal structure because of the difference of the target to which heat is imparted.

When using a particulate negative electrode active material, the active material is mixed with a binder, an electroconductive material, and a solvent to prepare an electrode mixture in a usual manner. The mixture is applied to a current collector made of, e.g., Cu and dried to form a negative electrode active material layer. If desired, the active material layer may be pressed after drying. The active material layer may be subjected to electroplating or electroless plating as immersed in a plating bath with the plating bath penetrating between particles of the negative electrode active material. In that case, a plating metal deposits in the active material layer to form a continuous three-dimensional network structure of the plating metal throughout the active material layer. The particles of the resulting negative electrode active material are covered with the deposited metal on at least a part of the surface thereof and held in the three dimensional network structure of the deposited metal. Throughout the active material layer, there is formed a three dimensional network of voids through which a nonaqueous electrolyte is allowed to pass. A metal that does not form a compound with lithium during charging is used advantageously as a plating metal. Examples of such a metal are Cu, Ni, Fe, and Co. Details of a negative electrode using a negative electrode active material having such a structure are described, e.g., in JP 2008-66278 A.

It is also preferred in the invention to use graphite in combination with the negative electrode active material of the invention. In this case, the negative electrode active material layer contains the negative electrode active material of the invention and graphite. A nonaqueous secondary battery having a negative electrode composed of such an active material layer exhibits both the high capacity possessed by silicon and the good cycle characteristics possessed by graphite in addition to the aforementioned various advantageous effects.

The negative electrode thus prepared is combined with a positive electrode, a separator, a nonaqueous electrolyte, and so on to complete a nonaqueous secondary battery. The positive electrode is composed of, for example, a current collector and a positive electrode active material layer formed on at least one side of the current collector. The positive electrode active material layer contains an active material. Any active materials known in the art for use in the positive electrode may be used, such as lithium-transition metal complex oxides, including $LiCoO_2$, $LiNiO_2$, $LiMnO_2$, $LiMn_2O_4$, $LiCo_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (where $0<x<1/3$), $LiFePO_4$, and $LiMn_{1-z}M_zPO_4$ (where $0<z\leq0.1$, and M is at least one metal element selected from the group consisting of Co, Ni, Fe, Mg, Zn, and Cu).

Exemplary and preferred separators to be used with the negative and the positive electrode are nonwoven fabric of synthetic resins and porous film of polyolefins, such as polyethylene and polypropylene, or polytetrafluoroethylene.

The nonaqueous electrolyte is a solution of a lithium salt, a supporting electrolyte, in an organic solvent. Examples of suitable organic solvents include ethylene carbonate, propylene carbonate, dimethyl carbonate, methylethyl carbonate, diethyl carbonate, and mixtures of two or more of them. Examples of the lithium salt include $CF_3SO_3Li$, $(CF_3SO_2)_2NLi$, $(C_2F_5SO_2)_2NLi$, $LiClO_4$, $LiAlCl_4$, $LiBF_4$, $LiPF_6$, $LiAsF_6$, $LiSbF_6$, $LiCl$, $LiBr$, $LiI$, and $LiC_4F_9SO_3$. These lithium salts may be used individually or as a combination of two or more thereof.

EXAMPLES

The invention will now be illustrated in greater detail by way of Examples. It should be noted, however, that the invention is not construed as being limited thereto.

Example 1

(1) Preparation of Negative Electrode Active Material
(1-1) Preparation of Silicon Solid Solution A silicon solid solution having boron as a solute was prepared by the steam explosion atomization method using the apparatus shown in FIG. 3 of WO 01/081033. The boron content in the solid solution was 2 atm % relative to 100 atm % of silicon. In the apparatus shown, the cylindrical mixing nozzle 2 had an inner diameter of 2.0 mm. The amount of the coolant swirling in the mixing nozzle was 100 L/min. Room temperature water was used as a coolant. A mixed melt of silicon and boron was kept heated at 1600° C. and allowed to fall dropwise (in free fall) in 13 g portions into the mixing nozzle 2. The cooling rate at this time was estimated to be $10^6$ to $10^8$ K/s in accordance with the method of estimation described in WO 2011/111709, para. [0042].

(1-2) Heat Treatment of Silicon Solid Solution

A vacuum heating furnace was purged with argon gas and then evacuated to $10^{-2}$ Pa. The furnace was again purged with argon gas, and the inner pressure was maintained at 0.05 MPa. In this state, the silicon solid solution obtained in (1-1) was heated at 950° C. for 1 hour. After natural cooling, the silicon solid solution was taken out of the furnace and pulverized in a counter jet mill. The pulverized silicon solid solution was observed using a TEM and by EELS to see localization of boron. The silicon solid solution before the heat treatment was also observed similarly. The results of observation are shown in FIGS. 2 and 3. As is shown in FIG. 2, localization of boron was not observed in the pre-heat-treated silicon solid solution either on the boundary or inside the crystal grain. As is shown in FIG. 3, in contrast, the post-heat-treated silicon solid solution was confirmed to show the presence of boron on the grain boundary indicated with *1 with no confirmation of the presence of boron in the inside of the crystal grain indicated with *2 or *3. These results provide confirmation that the heat treatment results in the localization of boron on the crystal grain boundaries. The fact that the presence of boron was not confirmed at the positions *2 and *3 in FIG. 3 is ascribed to the undetectably small amount of boron and does not mean absolute absence of boron.

The thus obtained negative electrode active material (silicon solid solution) was analyzed by XRD using the apparatus and conditions described supra. As a result, the negative electrode active material was confirmed to show diffraction peaks of silicon and to be a silicon solid solution. The amount of shift S2 of the peak corresponding to the peak assigned to the (422) plane of diamond-structured silicon from the position of the latter peak was obtained from the XRD pattern (peaks by $CuK\alpha_1$ radiation). The amount of shift S1 of the pre-heat-treated silicon solid solution was obtained in the same manner. The difference $\Delta S$ ($=S1-S2$) as calculated is shown in Table 1 below. Lattice strains L1 and L2 of the pre- and post-heat-treated silicon solid solution were obtained from the XRD pattern in accordance to the Hall method, and the difference between them, $\Delta L$ ($=L1-L2$), was calculated. The lattice strains L1 and L2 were calculated using nine peaks assigned to the (111), (220), (311), (400), (331), (422), (333), (440), and (531) planes. The results obtained are shown in Table 1. The particle size $D_{50}$ of the silicon solid solution measured using a laser diffraction scattering was as shown in Table 1. The average particle size $D_{50}$ was measured using a laser diffraction scattering particle size analyzer HRA (X-100) from Nikkiso Co., Ltd. Prior to the measurement, a sample of the silicon solid solution was put in an aqueous solution and irradiated with 30 W ultrasonic wave for 150 seconds at a flow rate of 40 ml/sec using a sample delivery controller 9320-X100 from Nikkiso.

(3) Making of Negative Electrode

A negative electrode was made as follows using the resulting negative electrode active material. The negative electrode active material, an electroconductive material, and a binder were mixed in a mixing ratio of 100:2:5 (wt %), and the mixture was suspended in N-methylpyrrolidone to obtain a negative electrode mixture. Acetylene black was used as the electroconductive material, and polyamideimide was used as the binder. The resulting negative electrode mixture was applied to an 18 μm thick electrolytic copper foil and dried to form a negative electrode active material layer.

(4) Making of Battery Cell

A 14 mm diameter disk was punched out from the resulting negative electrode and dried in vacuo at 160° C. for 6 hours. A size 2032 coin cell was assembled in an argon atmosphere in a glove box using the negative electrode of disk form, metallic lithium as a counter electrode, and, as an electrolyte, a 1 mol/L solution of $LiPF_6$ in a 1:1 (by volume) mixed solvent of ethylene carbonate and diethyl carbonate. Polypropylene porous film was used as a separator.

(5) Evaluation

The resulting coin cell was evaluated for reversibility in the initial charge/discharge cycle and charge/discharge cycle characteristics under the following conditions. The results on reversibility are shown in Table 1, and the results on cycle characteristics are shown in FIG. 4. The cell was charged to 1.5 V and discharged to 0.001 V. The charge/discharge rate was 0.05 C in the first cycle, 0.1 C in the second to fifth cycles, and 0.5 C in the sixth and subsequent cycles.

The negative electrode active material particles were evaluated for oxidation resistance in high temperatures as follows. Two grams of the negative electrode active material particles and 5 ml of a nonaqueous electrolyte were mixed, and the mixture was sealed in an aluminum laminate film container. All these operations were carried out in an argon atmosphere. As a nonaqueous electrolyte, a 1 mol/L solution of $LiPF_6$ in a 1:1 (by volume) mixed solvent of ethylene carbonate and diethyl carbonate was used. The container was left to stand in an environment of 45° C. for 4 days. After the four-day standing, the container was opened in an argon atmosphere, and the oxygen content of the negative electrode active material particles was determined by elemental analysis using an oxygen/nitrogen analyzer EMGA-620W from Horiba, Ltd. The result obtained is shown in Table 1.

Comparative Example 1

A size 2032 coin cell was made in the same manner as in Example 1, except that particulate pure silicon ($D_{50}$=2.7 μm) as non-heat-treated was used as a negative electrode active material. The coin cell was evaluated in the same manner as in Example 1. The results of evaluation are shown in Table 1 and FIG. 4.

Reference Example 1

A size 2032 coin cell was made in the same manner as in Example 1, except for using a negative electrode active material obtained by pulverizing the silicon solid solution as obtained in (1-1) and non-heat-treated. The coin cell was evaluated in the same manner as in Example 1. The negative electrode active material used had an amount of shift S1 of 0.49 and a lattice strain L1 of 0.43. The results of evaluation are shown in Table 1 and FIG. 4. The amount of shift S1 and the lattice strain L1 of Reference Example 1 were used as benchmarks for calculating ΔS and ΔL in Example 1.

solid solutions used in Examples 2 through 5 were confirmed by TEM and EELS observation to have localization of boron on the grain boundaries.

Reference Example 2

A negative electrode active material was prepared in the same manner as in Reference Example 1, except that the pulverization was not carried out. A coin cell was made in the same manner as in Example 2, except for using the thus prepared negative electrode active material, and evaluated for the same properties except oxygen concentration in the same manner as in Example 1. The negative electrode active material used had an amount of shift S1 of 0.49 and a lattice strain L1 of 0.29. The results of evaluation are shown in Table 2. The amount of shift S1 and the lattice strain L1 of Reference Example 2 were used as benchmarks for calculating ΔS and ΔL in Examples 2 to 5.

Example 6

A negative electrode active material was obtained in the same manner as in Example 1, except for changing the

TABLE 1

| | Active Material Particles | | | | | | | |
|---|---|---|---|---|---|---|---|---|
| | Solute Element Content (at % w.r.t. Si atom) | Alloying Element Content (at % w.r.t. Si atom) | $D_{50}$ (μm) | Heating Temp. (° C.) | Difference in Amount of Shift (ΔS) | Difference in Lattice Strain (ΔL) | Initial Irreversible Capacity (%) | Oxygen Concn. (%) |
| Example 1 | B = 2 | 0 | 2.6 | 950 | 0.39 | 0.11 | 10.0 | 2.20 |
| Compara. Example 1 | 0 | 0 | 2.7 | — | — | — | 16.0 | 3.47 |
| Ref. Example 1 | B = 2 | 0 | 2.6 | — | — | — | 13.1 | 2.69 |

Examples 2 to 5

Negative electrode active materials were obtained in the same manner as in Example 1, except that the heating temperature of the silicon solid solution was changed to 750° C. (Example 2), 850° C. (Example 3) or 1050° C. (Example 5) and that the heated silicon solid solution was not pulverized. A negative electrode active material was obtained in the same manner as in Example 1, except that the heated silicon solid solution was not pulverized (Example 4). A coin cell was assembled using each of these negative electrode active materials in the same manner as in Example 1, except that the mixing ratio of the negative electrode active material, the electroconductive material, and the binder was 100:5:10 (wt %). The coin cell was evaluated for the same properties except oxygen concentration in the same manner as in Example 1. The results of evaluation are shown in Table 2 below. While not graphically shown, the silicon composition as shown in Table 2. The resulting negative electrode active material was a composite composed of, as a matrix, a silicon solid solution having boron as a solute element and a silicon-nickel alloy precipitated in the matrix. The precipitation of a silicon-nickel alloy was confirmed by the detection of silicon and nickel at the same site of a small area of a cut section of the negative electrode active material particle in elemental mapping by EDX. A coin cell was made in the same manner as in Example 2 using the negative electrode active material and evaluated in the same manner for the same properties except oxygen concentration as in Example 1. The results obtained are shown in Table 2. The negative electrode active material had an amount of shift S1 (before heat treatment) of 0.5, a lattice strain L1 (before heat treatment) of 0.45, an amount of shift S2 (after heat treatment) of 0.11, and a lattice strain L2 (after heat treatment) of 0.36.

TABLE 2

| | Active Material Particles | | | | | | |
|---|---|---|---|---|---|---|---|
| | Solute Element Content (at % w.r.t. Si atom) | Alloying Element Content (at % w.r.t. Si atom) | $D_{50}$ (μm) | Heating Temp. (° C.) | Difference in Amount of Shift (ΔS) | Difference in Lattice Strain (ΔL) | Initial Irreversible Capacity (%) |
| Example 2 | B = 2 | 0 | 8.8 | 750 | 0.01 | 0.06 | 14.7 |
| Example 3 | B = 2 | 0 | 8.4 | 850 | 0.17 | 0.10 | 12.5 |
| Example 4 | B = 2 | 0 | 8.1 | 950 | 0.36 | 0.15 | 9.0 |

TABLE 2-continued

|  | Active Material Particles | | | | | |
|---|---|---|---|---|---|---|
|  | Solute Element Content (at % w.r.t. Si atom) | Alloying Element Content (at % w.r.t. Si atom) | $D_{50}$ (μm) | Heating Temp. (° C.) | Difference in Amount of Shift (ΔS) | Difference in Lattice Strain (ΔL) | Initial Irreversible Capacity (%) |
| Example 5 | B = 2 | 0 | 8.2 | 1050 | 0.39 | 0.18 | 15.3 |
| Ref. Example 2 | B = 2 | 0 | 9.2 | — | — | — | 15.8 |
| Example 6 | B = 2 | Ni = 5 | 2.6 | 950 | 0.39 | 0.09 | 8.2 |

As is apparent from the results in Tables 1 and 2, the coin cells having the negative electrodes of Examples exhibit higher reversibility in the initial charge/discharge cycle than the cell having a negative electrode active material comprising pure silicon (Comparative Example 1). As is apparent from a comparison of Example 1 with Comparative Example 1 and Reference Example 1, the negative electrode active material of Example 1 proves to bring about improvement on charge/discharge cycle characteristics. Furthermore, a comparison of oxygen concentration between Example 1 and Comparative Example 1 proves that the negative electrode active material of Example 1 exhibits higher resistance to oxidation in high temperature than that of Comparative Example 1.

Example 7

A negative electrode was made in accordance with the method disclosed in U.S. Pat. No. 8,197,966B2 as follows. A current collector formed of 18 μm thick electrolytic copper foil was cleaned with an acid cleaning solution at room temperature for 30 seconds and then washed with pure water for 15 seconds. A slurry containing the negative electrode active material prepared in Example 1 was applied to both sides of the current collector to a thickness of 15 μm per side to form a coating layer. The composition of the slurry was negative electrode:styrene-butadiene rubber (binder):acetylene black=100:1.7:2 by weight.

The current collector having the coating layers was immersed in a copper pyrophosphate bath having the following composition, and the coating layers were plated with copper by electrolysis under the following electrolysis conditions to form an active material layer on each side. A DSE was used as an anode, and a direct current power source was used. The electroplating was stopped at the time when copper was deposited throughout the thickness of each coating layer. An active material layer was thus formed to provide a negative electrode. The $P_2O_7$ to Cu weight ratio, $P_2O_7$/Cu, of the copper pyrophosphate bath was 7.
Copper pyrophosphate trihydrate: 105 g/l
Potassium pyrophosphate: 450 g/l
Potassium nitrate: 15 g/l
Bath temperature: 50° C.
Current density: 3 A/dm²
pH: adjusted to 8.2 by the addition of aqueous ammonia and polyphosphoric acid.

Figure 5:
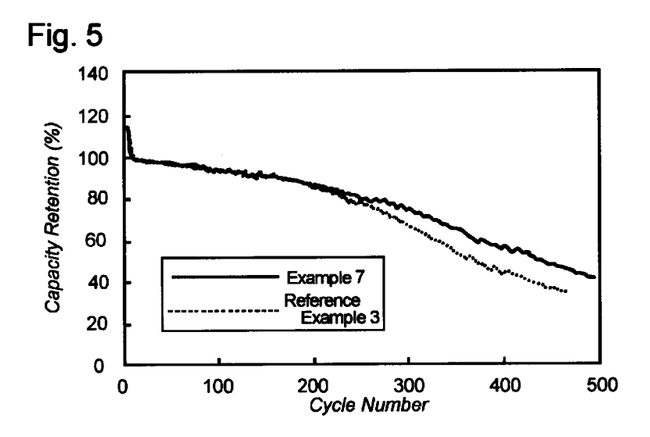
FIG. 5 is a graph showing the charge/discharge cycle characteristics of laminate cells made by using the negative electrodes obtained in Example 7 and Reference Example 3.

A lithium secondary battery was assembled using the resulting negative electrode as follows and evaluated for charge/discharge cycle characteristics. $LiNi_{1/3}Mn_{1/3}CO_{1/3}O_2$ having 20 wt % $Li_{1.05}Ni_{0.7}Ti_{0.2}(Mn_{2/3}Li_{1/3})_{0.1}O_2$ added thereto was used as a positive electrode active material. The positive electrode active material was suspended in N-methylpyrrolidone as a solvent together with acetylene black and polyvinylidene fluoride to prepare a positive electrode mixture. The mixing ratio of the positive electrode active material, acetylene black, and polyvinylidene fluoride was 88:6:6 by weight. The positive electrode mixture was applied using an applicator to a current collector formed of 20 μm thick aluminum foil, dried at 120° C., and roll-pressed under a load of 0.5 ton/cm to make a positive electrode. A 1 mol/L solution of $LiPF_6$ in a 1:1 (by volume) mixed solvent of ethylene carbonate and diethyl carbonate was used as an electrolyte. Polypropylene porous film was used as a separator. The laminate cell assembled using these members (electrode size: negative electrode, 42 mm×31 mm; positive electrode, 40 mm×29 mm) was repeatedly charged and discharged under the following conditions to evaluate the cycle characteristics. The results obtained are shown in FIG. 5. The charging was carried out in a constant current-constant voltage (CC-CV) mode up to a voltage of 4.2 V. The charge was completed at the time when the current rate reduced to C/5. The discharge was carried out in a constant current (CC) mode to a voltage of 2.7 V. The charge and discharge rate was 0.05 C in the first cycle, 0.1 C in the second to fifth cycles, and 0.5 C in the sixth and subsequent cycles.

Reference Example 3

A laminate cell was made in the same manner as in Example 7, except for using the negative electrode active material used in Reference Example 1 (a silicon solid solution in which boron is not localized on the grain boundaries). The laminate cell was evaluated for charge/discharge cycle characteristics in the same manner as in Example 7. The results obtained are shown in FIG. 5.

The results in FIG. 5 prove that the cell battery having the negative electrode active material comprising the silicon solid solution having boron localized on the grain boundaries exhibits improved charge/discharge cycle characteristics compared with the cell having the negative electrode active material comprising the silicon solid solution having no localization of boron on the grain boundaries.

The invention claimed is:

1. A negative electrode active material for nonaqueous secondary batteries, comprising a silicon solid solution as a matrix having one or more than one element selected from the group consisting of boron, germanium, tin, arsenic, antimony and bismuth and being incorporated as a solute in silicon, the one or more than one element being present more on crystal grain boundaries of the silicon solid solution than inside crystal grains,
   wherein the amount of the one or more than one element in the silicon solid solution is 1 to 6 at % relative to silicon atom, and
   wherein the silicon solid solution has a particulate form in which a particle size of the silicon solid solution is 2 to 10 μm in terms of $D_{50}$ as measured by a laser diffraction scattering.

2. A process for producing the negative electrode active material for nonaqueous secondary batteries as set forth in claim 1, comprising the steps of:

- preparing a mixed melt of silicon and a semimetal element selected from the group consisting of boron, germanium, tin, arsenic, antimony and bismuth
- introducing the mixed melt into a liquid coolant to form a vapor film covering the mixed melt in the coolant,
- rupturing the vapor film to bring the mixed melt and the coolant into direct contact to cause boiling as a result of spontaneous nucleation,
- rending and atomizing the mixed melt by making use of a pressure wave resulting from the boiling while cooling and solidifying the mixed melt to give a silicon solid solution as a matrix having said semimetal element incorporated as a solute, and
- heating the silicon solid solution at 500° to 1200° C. for 0.3 to 20 hours.

3. A negative electrode for nonaqueous secondary batteries comprising the negative electrode active material set forth in claim 1.

4. A nonaqueous secondary battery comprising the negative electrode set forth in claim 3.

5. The negative electrode active material according to claim 1, wherein the amount of the element in the silicon solid solution is 1 to 3 at %.

\* \* \* \* \*